United States Patent
Wakabayashi

[11] Patent Number: 5,700,217
[45] Date of Patent: Dec. 23, 1997

[54] POWER TRANSMISSION CHAIN WITH FORMED BUSHING AND ASSOCIATED APERTURE

[75] Inventor: Shozo Wakabayashi, Hirakata, Japan

[73] Assignee: Borg-Warner Automotive, K.K., Nabari, Japan

[21] Appl. No.: 648,587

[22] Filed: May 16, 1996

[51] Int. Cl.⁶ .................................................. F16G 13/04
[52] U.S. Cl. .......................... 474/217; 474/229; 474/214
[58] Field of Search ................................. 474/212–217, 474/226, 228, 229

[56] References Cited

U.S. PATENT DOCUMENTS

| | | |
|---|---|---|
| 856,528 | 6/1907 | James .................................. 474/229 |
| 958,676 | 5/1910 | Dodge . |
| 1,159,163 | 11/1915 | Best ................................ 474/229 X |
| 1,269,997 | 6/1918 | Baumann . |
| 1,496,298 | 6/1924 | Chapman . |
| 1,560,646 | 11/1925 | Belcher . |
| 1,560,647 | 11/1925 | Belcher . |
| 1,569,234 | 1/1926 | Muller . |
| 1,570,274 | 1/1926 | Muller . |
| 1,624,058 | 4/1927 | Morse . |
| 1,689,556 | 10/1928 | Nichols . |
| 1,759,089 | 5/1930 | Black ................................ 474/229 |
| 1,780,040 | 10/1930 | Pierce . |
| 1,825,675 | 10/1931 | Morse . |
| 2,101,341 | 12/1937 | Perry . |
| 2,517,497 | 8/1950 | Lauenstein ......................... 59/35 |
| 2,741,139 | 4/1956 | Krekeler ......................... 474/214 X |
| 2,956,442 | 10/1960 | Krekeler .......................... 474/229 |
| 3,585,872 | 6/1971 | McDowell ......................... 474/229 |
| 3,590,650 | 7/1971 | Rollins ........................... 474/229 |
| 3,605,514 | 9/1971 | Mitchell .......................... 474/229 |
| 3,969,889 | 7/1976 | Araya .............................. 59/8 |
| 4,729,756 | 3/1988 | Zimmer ........................... 474/214 |
| 5,192,253 | 3/1993 | Cole et al. ..................... 474/229 X |
| 5,562,559 | 10/1996 | Kolhatkar ......................... 474/229 |

*Primary Examiner*—Roger J. Schoeppel
*Attorney, Agent, or Firm*—Sidley & Austin; Greg Dziegielewski

[57] ABSTRACT

A power transmission chain in which round pins are inserted in link apertures with D-shaped cross-section and a bushing of U-shaped cross-section. The bushing can be formed of several different shapes in order to decrease the wear between the pins and the associated link apertures.

6 Claims, 5 Drawing Sheets

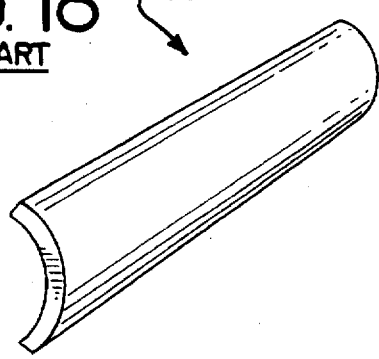
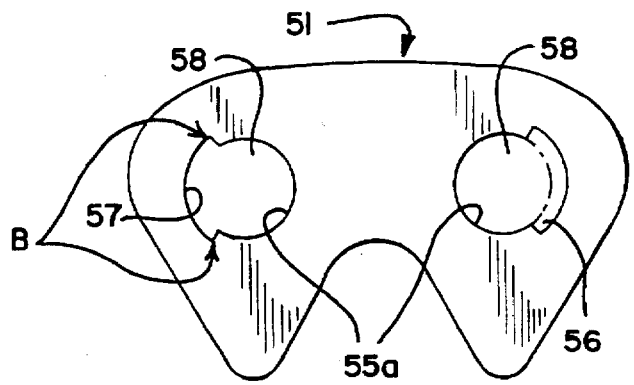
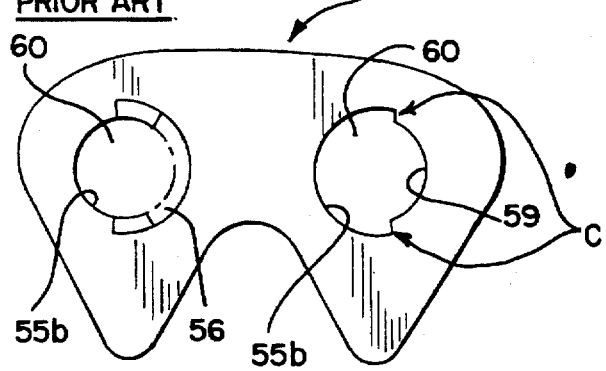
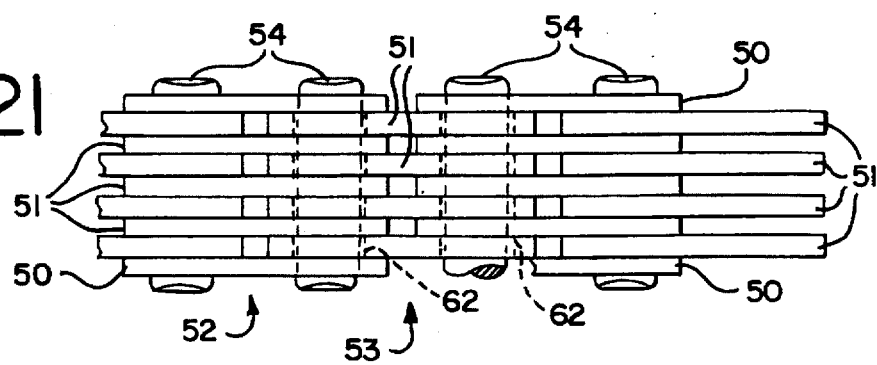
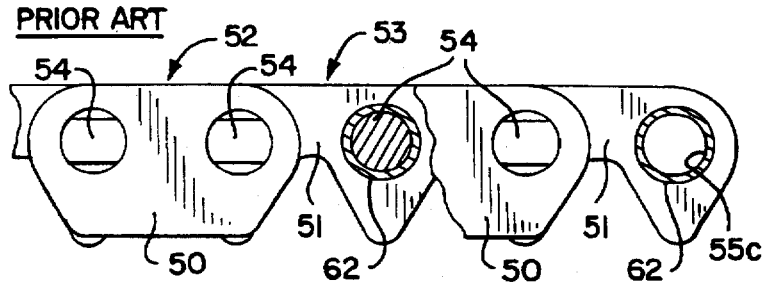
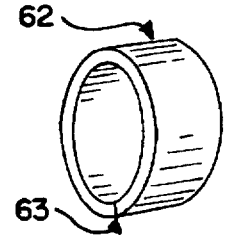

POWER TRANSMISSION CHAIN WITH FORMED BUSHING AND ASSOCIATED APERTURE

BACKGROUND OF THE INVENTION

This invention relates to a power transmission chain and, in particular, it relates to an improved chain construction that reduces wear and elongation, improves fatigue strength, and improves pin and link strengths.

Silent chains are conventionally used as a power transmission chain for automobiles, motor bikes, and other vehicles. A conventional silent chain is shown in FIGS. 14 and 15. The chain includes round pins placed in the link apertures of the interleaved links. The links are interleaved in sets or rows of links, which include guide link rows 52 alternating with non-guide rows 53. In the guide rows, guide links 50 are along the outer edges of each row with links plates between the guide links, while non-guide rows are comprised of link plates 51 without guide links on the outsides. Both guide rows and non-guide rows include link plates 51, which are connected by round pins 54, as shown in FIGS. 14 and 15.

In general, a silent chain bends and stretches repeatedly under tension F during its operation. Therefore, in the described round pin silent chain, link plate 51 rotates around pin 54 and wear tends to occur between both the outside parts of left hand and right hand apertures 55 of each link plate 51 in the nonguide link row 53, as shown at location A of FIG. 15, and the pin sliding face that slides on the aperture.

Such wear increases the elongation of the entire chain and, when this elongation exceeds a certain allowable range, problems such as riding-over of the chain over the sprocket teeth can occur.

Many efforts have been made to suppress or improve resistance to chain wear. For example, material of good wear resistance, with specialized heat treatment, is used for the pins and link plates, and the surface finish accuracy is improved for the pinholes in the link plate and pins.

Additionally, liner has been added to a portion of the aperture in which the pin slides. Also, bushings have been added to the part of the aperture in which the pin slides.

One example of a liner is shown in FIGS. 16–20. In these figures, liner 56 in tile form, which extends in the direction of the thickness of link plate 4, is provided along the outside of the round pins 54, i.e., the inside of each round pin 54 when viewed from guide link row 52 that runs through nonguide link row 53. Also, left hand/right hand pinholes 58 (see FIG. 19) of each link plate 51, which are aligned in nonguide link rows 53, include an arc-like hole 55a into which round pin 54 is inserted and arc-like hole 57 which protrudes outward in an arc form and into which the tile-form liner 55 is installed. Left hand/right hand pinholes 60 (see FIG. 20) of each of link plates 51 that comprise guide link row 52 similarly include arc-like holes 55b into which round pin 54 is inserted and arc-like hole 59 that protrudes inward in an arc form, and into which the tile form liner 55 is installed.

An example of a bushing is shown in FIGS. 21–23. Into the apertures 55c of each link plate 51 that comprises nonguide link row 53, bushings 62 are press-fit or inserted and a round pin 54 is inserted slidably into the bushing 62.

In this example of a bushing shown in FIGS. 19 and 20, apertures 58 and 60 of each link plate 51 are stepped and steps B and C of each hole must be located at the weakest parts of link plate 51. Therefore, stress tends to concentrate at the stepped parts B and C under tension of the chain and fatigue strength tends to decrease. Also, the chain can only bend as far as aperture step C of link plate 51 (FIG. 20) on the side of guide link row 52 and reaches and contacts the end-face of lines 56. Therefore, its bending angle is limited so that it is not suitable for use with a tensioner like the timing chain of an engine.

In this same example of a bushing, rotation of the bushing is stopped by press-fitting bushing 62 into aperture 55c of link plate 51. Therefore, the thickness must be of a certain magnitude to ensure the strength of the bushing 62. However, when the pinhole diameter is increased, the strength of the link decreases and when the pin diameter is reduced, the pin strength decreases. Also, bushing 58 is manufactured, in general, by rolling plate material due to manufacturing costs. In such a case, strain occurs at its joint 63 and true roundness is difficult to form. In addition, a polishing medium for barrel polishing does not quite reach the inner surface of the bushing 58, and therefore, polishing of the inner face is difficult.

In the example of wear resistant material described above, since the link plate is stamped, accuracy of the surface finish of the inner surface of the apertures in the link plate is limited. Also, placement of the pinholes of laminated multiple link plates in a lengthwise-direction straight line is not easy. Therefore, in this case, assurance of a good sliding surface for the pin outer surface is extremely difficult.

The present invention addresses such a situation and its purpose is to offer a power transmission chain which reduces wear elongation, suppresses a decrease in fatigue strength, and suppresses a decrease of the strength of the pins and links.

SUMMARY OF THE INVENTION

A power transmission chain has multiple link plates set in the lengthwise direction and transverse direction, in each of which a pair of apertures is formed. The chain has link plates rotatably connected by pins of a near round cross-section, which are inserted in the pinholes and has guide link plates on the outermost sides of the link plates. The present invention is concerned with such a power transmission chain, characterized by forming apertures in each link plate of at least one link row of a guide link row and nonguide link row, which are set between adjacent guide link plates placed in the same lengthwise direction position as the guide link plates. The apertures are formed in a near letter D cross-section composed of a nearly semicircular surface and a flat surface that connects the two ends of the semicircular surface. A near circular cross-sectioned bushing that follows the near semicircular surface is inserted in the aperture. The two ends of the bushing contact the flat surface.

In this invention, apertures in each link plate of at least one link row of the guide link row and nonguide link row are formed in a near letter D cross-section. Bushings that follow the near semicircular surfaces of the pinholes are installed in the pinholes. In this manner, wear of the pins and links is suppressed and wear elongation of the chain is reduced.

In addition, since the pinhole of the link plate is formed in a near letter D cross-section, there are no steps and the stress concentration location is offset from the weakest part of the link plate. Accordingly, the decrease of fatigue strength of the chain can be suppressed. Also, because rotation of the bushing is stopped by contact of the two ends of the bushing with the flat surface of the aperture, the thickness of the bushing need not be so thick for press fitting it into the pinhole. Thus, the decrease of strengths of the pins and links can be suppressed. In addition, since the bushing is formed in a near semicircular cross-section, polishing media for barrel polishing, for example, can easily pass on the inner surface of the bushing (pin sliding surface). Thereby, the bushing inner surface can easily be polished and the accuracy of the surface finish of the bushing inner surface is improved for further suppression of wear on the pins and links.

BRIEF DESCRIPTION OF THE DRAWINGS

FIG. 18 is a perspective view of the liner.

FIG. 19 is a front view of the link plate of the nonguide link row that comprises the silent chain with the liner.

FIG. 20 is a front view of the link plate of the guide link row that composes the silent chain with liner.

FIG. 21 is a silent chain of the prior art with conventional bushing that corresponds to FIG. 1.

FIG. 22 is a front view of the chain of FIG. 21.

FIG. 23 is a perspective view of the bushing.

DETAILED DESCRIPTION OF THE INVENTION AND PRESENTLY PREFERRED EMBODIMENTS

Practical examples of this invention are explained by reference to the attached figures.

Figure 1:
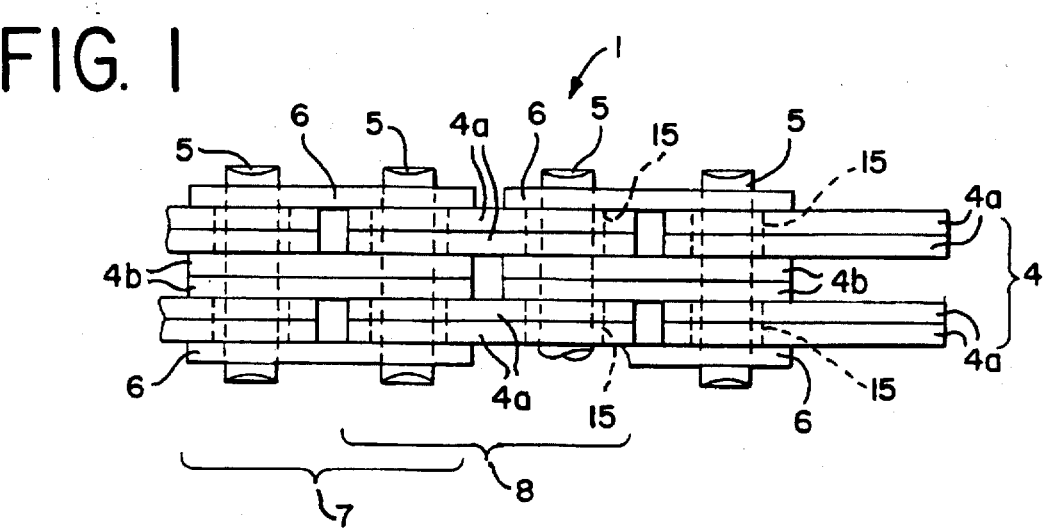
FIG. 1 is a partial plan view of the silent chain of one embodiment of this invention.
Figure 2:
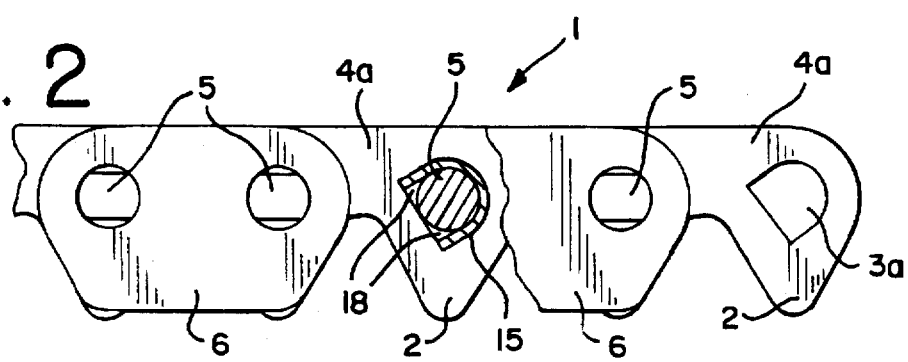
FIG. 2 is a partial front view of the silent chain of FIG. 1.
Figure 3:
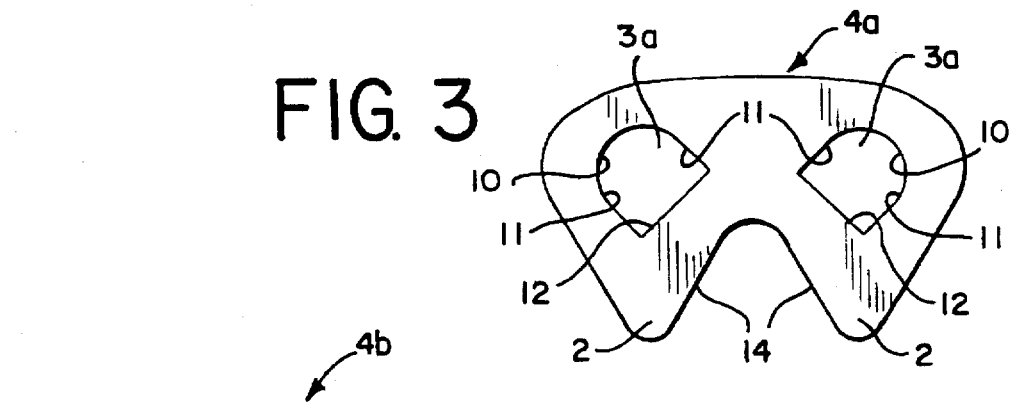
FIG. 3 is a front view of the link plate of the nonguide link row that comprises the silent chain of FIG. 1.
Figure 4:
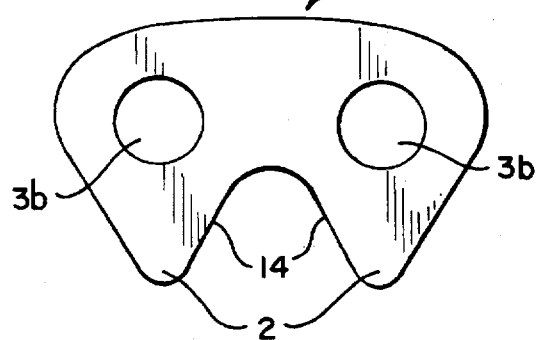
FIG. 4 is a front view of the link plate of the guide link row that comprises the silent chain of FIG. 1.
Figure 5:
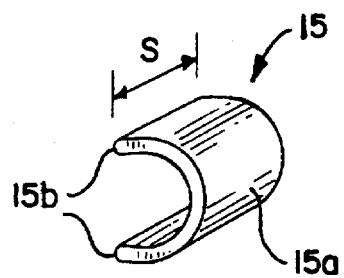
FIG. 5 is a perspective view of the U-shaped cross-sectioned bushing installed in the link plate of the nonguide row.
Figure 6:
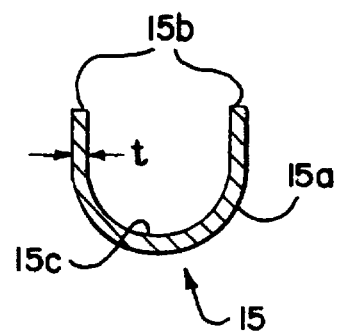
FIG. 6 is a cross-sectional view of the U-shaped cross-sectioned bushing.

FIGS. 1–6 illustrate a practical example of the silent chain of this invention. FIG. 1 is a partial plan view of the silent chain. FIG. 2 is its front view. FIG. 3 is a side view of the link plate of the nonguide link row. FIG. 4 is a side view of the link plate of the guide plate row. FIG. 5 is a perspective view of the U-shaped bushing and FIG. 6 is its cross-sectional view.

As shown in FIGS. 1–4, silent chain 1 has link plate 4 (4a, 4b), in which a pair of teeth 2 and a pair of apertures or pinholes 3 (3a, 3b) are formed. The links are aligned in sets or rows of links and interleaved (in the lengthwise direction of FIG. 1). Connecting pins 5 of round or near circular cross-section are inserted in the pinholes 3 of these link plates 4 for pivoting of each link plate 4 with respect to one another. Guide link plate 6 are positioned on the outermost side of the link plate 4 and have the end of the connecting pin 5 fixed onto the guide link plate 6 by press fit, staking, or welding.

In this manner, the silent chain 1 is comprised of guide link row 7 with link plates 4b set in the same lengthwise direction position as guide link plate 6, and nonguide link row 8 is comprised of link plates 4a placed between adjacent guide link plates 6. Incidentally, so-called two-plate link plate arrangement, in which each two layers of link plates 4 are interleaved in the thickness direction, is given here as an example.

Pinhole 3a of link plate 4a of the nonguide link row 8, as shown in FIG. 3, is formed with a semicircular surface 10, a flat surface 11 which extends in the tangential direction of surface 10 and forms a letter U-shaped surface (near semicircular surface) with the semicircular surface 10, and a flat surface 12 that connects both sides of the flat surface 11. That is, the pinhole 3a is formed in a near letter D cross-section. Also, the pinhole 3a is tilted to a direction of intersection of its center line (one-dot chain lines) with an inside flank 14 of link plate 4a, preferably to a direction of right intersection. That is, the flat surface 12 is nearly parallel to the inside flank 14. Pinhole 3b of link plate 4b of the guide link row 7 has a near circular form (see FIG. 4).

Bushing 15 of the U-shaped cross-section (near semicircular form), as shown in FIGS. 5 and 6, is inserted in aperture 3a of link plate 4a of the nonguide link row 8 (see FIGS. 1 and 2). The U-shaped surface 15a of the bushing 15 follows the U-shaped surface of pinhole 3a and both its ends 15b contact flat surface 12 of pinhole 3a. Also, length s (see FIG. 5) of bushing 15 is approximately the same as the thickness of 2 layers of link plates 4a.

In operation, silent chain 1 undergoes repeated bending and stretching under operational tension and, in such case, D-shaped cross-section of pinhole 3a of each link plate 4a of nonguide link row 8 and bushings 15 that follow U-shaped surfaces 10, 11, which are installed in pinholes 3a, suppress wear on pins 5 and link plate 4. As a result, the wear elongation of silent chain 1 is reduced.

Also, because of the D-shaped cross-section of pinhole 3a of link plate 4a, there are no steps and the stress concentration location (corner of pinhole 3a) is offset from the weakest part of link plate 4a. Thus, a decrease of the fatigue strength of silent chain 1 is suppressed. In addition, because of stopping the rotation of the bushing 15 by contacting both ends 15b of bushing 15 with flat surface 12 of pinhole 3a, bushing 15 needs not be press-fitted into pinhole 3a. Therefore, the thickness t of bushing 15 need not be large, so that the decrease of strength of link plate 4a and pin 5 is suppressed.

Also, because of the U-shaped cross-section of bushing 15, the polishing medium for barrel polishing, for example, can easily pass on inner surface 15c (pin-sliding surface) of the bushing 15. Thus, polishing of the inner surface 15c of the bushing becomes easier and the accuracy of the surface finish of the bushing inner surface 15c is improved for further suppression of the wear of pins 5 and link plates 4a. Incidentally, various processes such as drawing, bending, and the like, can be used for formation of the U-shaped cross-section of the bushing 15. Therefore, its manufacturing process is simplified.

In addition, formation of the U-shaped cross-section of bushing 15 allows gap 18 (see FIG. 2), which is formed by insertion of pin 5 into the bushing 15, to act as an oil reservoir. Accordingly, lubricant oil can be distributed throughout the sliding surface between pin 5 and bushing 15, and the wear on pin 5 and link plate 4a can be further reduced.

Also, the so-called two-plate link plate arrangement in which two layers of link plates 4 are interleaved or set in the transverse direction is used here for proper alignment between bushing inner surface 15c and pin 5, which ensures a wide sliding surface and prevents the offset wear of pin 5.

Installation of bushing 15 only onto link plate 4a of nonguide link row 8 allows for the near circular form of pinhole 3b of link plate 4b of guide link row 7. Thus, stress concentration in pinhole 3b of the link plate 4b can be prevented. At the same time, the near circular form of pinhole 3b further improves the alignment between bushing inner surface 15c and pin 5. In addition, rotation of each link plate 4 around pin 5 can be increased to increase the bending of the chain, so that, for example, silent chain 1 can utilized as an engine timing chain.

Figure 7:
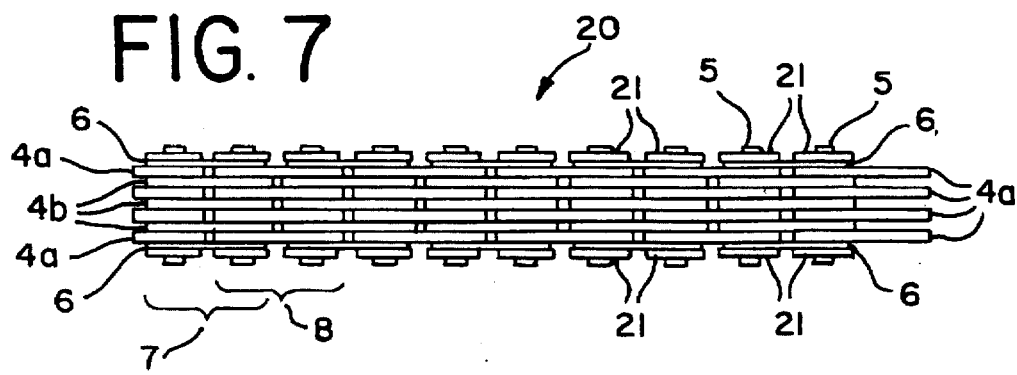
FIG. 7 is a plan view of the silent chain of another embodiment of this invention.

Next, the silent chain of another embodiment of this invention is shown in FIG. 7. In FIG. 7, the same codes as for FIG. 1 indicate the same or corresponding parts. The differences between silent chain 20 and silent chain 1 of FIG. 1 are the one-plate arrangement of link plate, positioning of retention plates 21 on the two outsides of guide link plates 6 and the engagement of the plate 21 onto the end of pin 5. Therefore, in this case, pin 5 is not fixed onto guide link plate 6 by staking and its rotation is free, so that the sliding surface can be on the total circumference of pin 5 to prevent offset wear of pin 5.

Because of such free rotation of pin 5, when this type of silent chain 20 is used, it is preferable to insert the U-shaped cross-sectioned bushings in the pinholes by forming each pinhole in the near D-shaped cross-section not only for link plate 4a of nonguide link row 8, but also for link plate 4b of guide link row 7. However, the characteristics of this invention are preferably applied to only one of these link rows.

Figure 8:
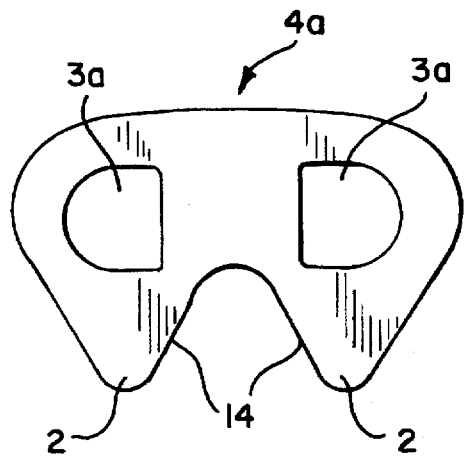
FIG. 8 is another embodiment of the aperture formed in the link plate of the nonguided link row.
Figure 9:
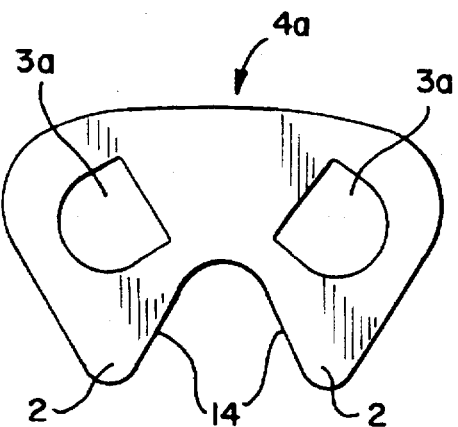
FIG. 9 is another embodiment of the aperture formed in the link plate of the nonguided link row.

In the first described embodiment, pinhole 3a was tilted toward the direction of the intersection of its center line with inside flank 14 of link plate 4a in one example (see FIG. 3, one-dot chain line). However, tilting of the pinhole 3a is not limited to such an angle. Tilting can be at any angle (see FIGS. 8 and 9) as long as a sliding surface is ensured between a part of the inner cylindrical surface of the bushing and pin outer surface (pin sliding surface).

Figure 10:
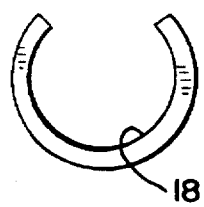
FIG. 10 is another embodiment of the U-shaped cross-sectioned bushing that corresponds to FIG. 6.
Figure 11:
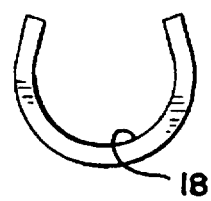
FIG. 11 is another embodiment of the U-shaped cross-sectioned bushing that corresponds to FIG. 6.
Figure 12:
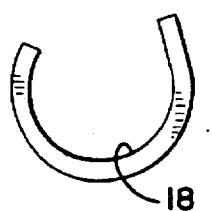
FIG. 12 is another embodiment of the U-shaped cross-sectioned bushing that corresponds to FIG. 6.

Also, bushing 15 is not limited to the U-shaped cross-section in FIG. 6. It can be in a near ring shape cross-section (see FIG. 10) of the partially cut-out cylinder, horseshoe shape (FIG. 11) or an asymmetric horseshoe shape (see FIG. 12), as long as at least a semicircular surface is maintained. All of these shapes maintain a near semicircular pin sliding surface 18.

The link plate arrangement of this invention is not limited to a two-plate or one-plate arrangement. This invention can be applied to any other link plate arrangement. For example, randomly arranged link plates also can be used as the link plates 4 of the above embodiment. Here, the link plate has its inside flank produced in arc form, different from the straight-line flank (see inside flank 14 in FIGS. 3 and 4). Application of this invention to such a random chain containing such link plates in a random manner can reduce wear elongation, suppress the decrease of fatigue strength and the strengths of pins and links.

Figure 13:
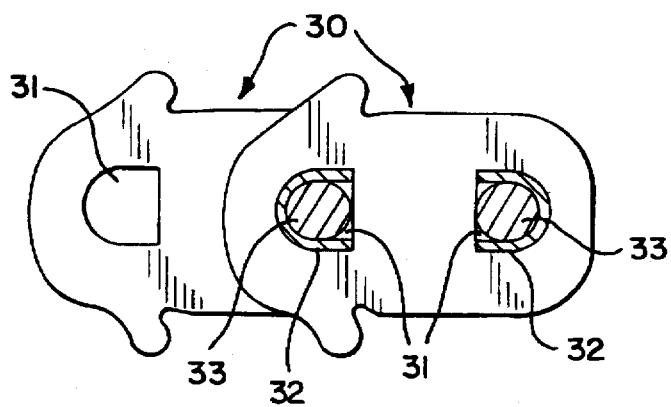
FIG. 13 is an application of this invention to CVT chain.
Figure 14:
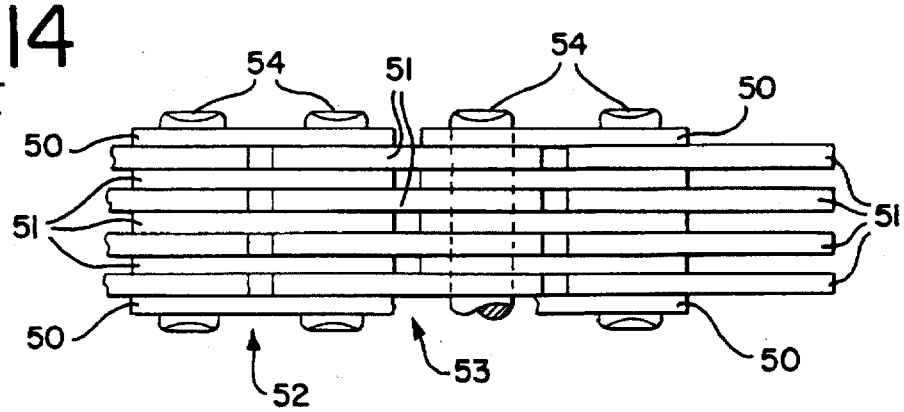
FIG. 14 is a conventional silent chain of the prior art that corresponds to FIG. 1.
Figure 15:
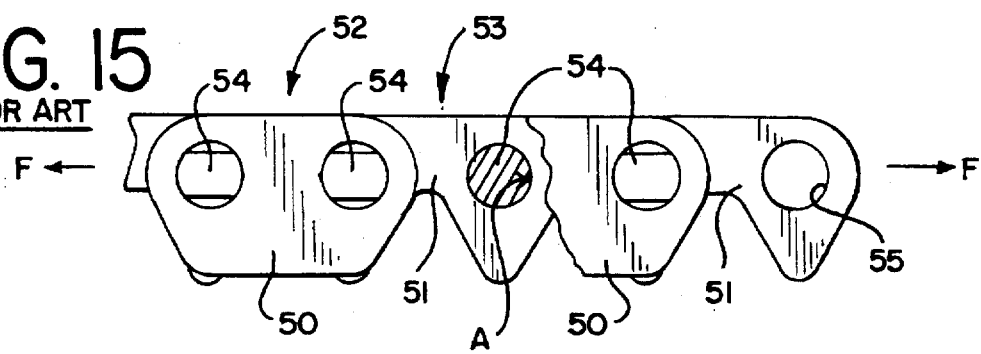
FIG. 15 is a front view of the chain of FIG. 14.
Figure 16:
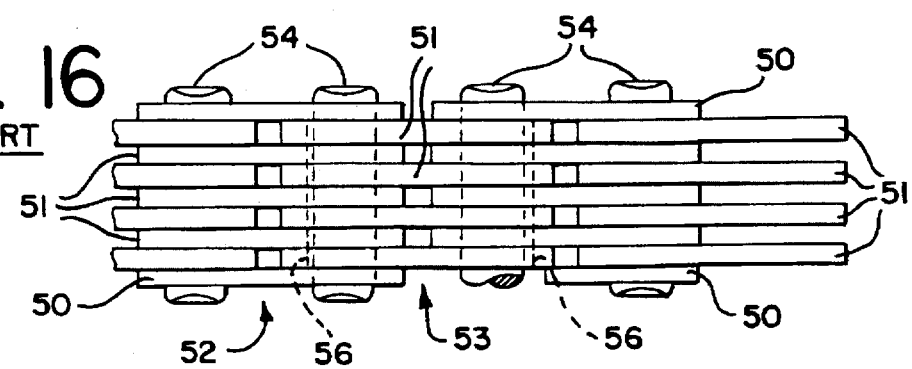
FIG. 16 is a conventional silent chain with liner that corresponds to FIG. 1.
Figure 17:
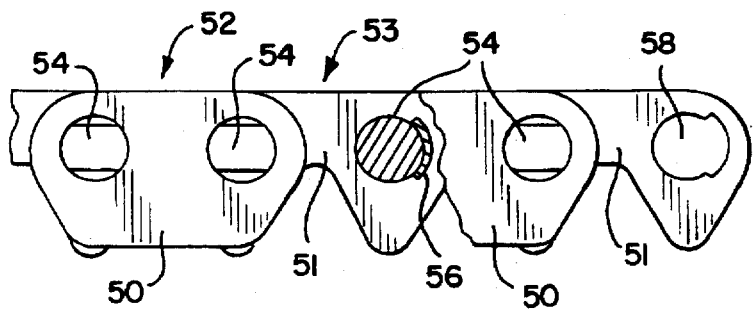
FIG. 17 is a front view of the chain of FIG. 16.

In addition to the application of this invention to a silent chain, it can be applied similarly to a CVT (Continuously Variable Transmission) chain (e.g. Laid-Open Patent Hei 1-145447). FIG. 13 shows only the link plate of the CVT chain of the above patent. The D-shaped cross-sectioned pinholes 31 are formed in this link plate 30. Similar to FIG. 8, U-shaped cross-sectioned bushings 32 are inserted in pinholes 31, and near round cross-sectioned connecting pin 33 is inserted in bushing 32. Application of this invention to the CVT chain can reduce wear elongation, suppress the decrease of fatigue strength and the strengths of the pins and links of the CVT chain.

As explained above, in operation, the power transmission chain has pinholes of each link plate of at least one guide link row and the nonguide link row formed in the near D-shaped cross-section, and has a bushing that follows the near semicircular surface of the pinhole. Therefore, the wear on the pins and links is suppressed and wear elongation of the chain is reduced.

In addition, in this case, the pinhole of the link plate is formed in the near D-shaped cross-section. Therefore, there are no steps and stress concentration is offset from the weakest part of the link plate, so that the decrease of fatigue strength of the chain can be suppressed. Also, because the rotation of the bushing is stopped by contact of the two ends of the bushing with the flat surface of the pinhole, the bushing does not have to be thick for press-fitting into the pinhole. Therefore, the decrease of strengths of the pins and links can be suppressed.

What is claimed is:

1. A power transmission chain comprising a plurality of rows of interleaved links, each of said links having a pair of apertures, said links being interconnected pin by pivot members extending through aligned apertures of adjacent links, said pivot members having a substantially circular cross-sectional shape, some of said rows of links being guide rows having guide links on the outermost sides of the said rows of links, said guide rows alternating with nonguide link rows, said apertures in each link of at least one link row of a guide link row and a nonguide link row having a nearly D-shaped cross-section, said D-shaped cross-section including a near semicircular surface and a flat surface that connects both ends of the semicircular surface and, said D-shaped apertures having a near semicircular cross-sectioned bushing inserted in said aperture, said semicircular bushing coinciding with the said near semicircular surface of said D-shaped aperture, both ends of said bushing contacting the flat surface of said D-shaped aperture.

2. The power transmission chain of claim 1 wherein said flat surfaces of said D-shaped apertures are perpendicular to a centerline extending between the D-shaped apertures.

3. The power transmission chain of claim 1 wherein said flat surfaces of said D-shaped apertures are at an angle with respect to a centerline extending between the D-shaped apertures.

4. The power transmission chain of claim 1 wherein said bushing is formed in a cross-sectional shape of a cylindrical horseshoe.

5. The power transmission chain of claim 1 wherein said bushing is formed in a cross-sectional shape of an asymmetric horseshoe.

6. The power transmission chain of claim 1 wherein said pin and said semi-circular bushing form an oil reservoir.

* * * * *